US011856930B2

(12) United States Patent
Ochiai et al.

(10) Patent No.: US 11,856,930 B2
(45) Date of Patent: Jan. 2, 2024

(54) COLLAR MEMBER FOR SPINNING REEL

(71) Applicant: Shimano Inc., Sakai (JP)

(72) Inventors: Koji Ochiai, Sakai (JP); Kei Saito, Sakai (JP); Akira Niitsuma, Sakai (JP); Satoshi Ikebukuro, Sakai (JP); Atsushi Kawamata, Sakai (JP)

(73) Assignee: Shimano Inc., Sakai (JP)

( * ) Notice: Subject to any disclaimer, the term of this patent is extended or adjusted under 35 U.S.C. 154(b) by 0 days.

(21) Appl. No.: 17/848,791

(22) Filed: Jun. 24, 2022

(65) Prior Publication Data

US 2023/0061422 A1 Mar. 2, 2023

(30) Foreign Application Priority Data

Sep. 1, 2021 (JP) ................................. 2021-142669

(51) Int. Cl.
*A01K 89/01* (2006.01)

(52) U.S. Cl.
CPC ................................ *A01K 89/0111* (2013.01)

(58) Field of Classification Search
CPC .... A01K 89/011221; A01K 89/011223; A01K 89/0113; A01K 89/0111
See application file for complete search history.

(56) References Cited

U.S. PATENT DOCUMENTS

2015/0264906 A1* 9/2015 Miyamoto et al. .........................
A01K 89/011223

FOREIGN PATENT DOCUMENTS

| EP | 3087834 A1 | * | 11/2016 | ............. A01K 89/01 |
| JP | 2013226109 A | * | 11/2013 | ......... A01K 89/0111 |
| JP | 2016-029949 A | | 3/2016 | |
| WO | WO-2017212672 A1 | * | 12/2017 | ............. A01K 89/01 |

* cited by examiner

*Primary Examiner* — Emmanuel M Marcelo
(74) *Attorney, Agent, or Firm* — United IP Counselors, LLC

(57) ABSTRACT

A collar member is used for a spinning reel. The spinning reel has a reel body, a spool shaft that moves in a front-back direction with respect to the reel body, a pinion gear that rotates around the spool shaft, a rotor nut that rotates integrally with the pinion gear, and a bearing that is disposed between the spool shaft and the rotor nut in a radial direction and rotatably supports the rotor nut. The collar member is disposed between the spool shaft and the bearing in the radial direction. The collar member is formed by a resin material that has a linear expansion coefficient of $10\times10^{-6}$ (1/° C.) or more and $50\times10^{-6}$ (1/° C.) or less.

2 Claims, 3 Drawing Sheets

COLLAR MEMBER FOR SPINNING REEL

CROSS-REFERENCE TO RELATED APPLICATIONS

This application claims priority to Japanese Patent Application No. 2021-142669, filed Sep. 1, 2021. The contents of that application are incorporated by reference herein in their entirety.

TECHNICAL FIELD

The present invention relates to a collar member for a spinning reel.

BACKGROUND ART

Conventional spinning reels are equipped with a reel body, a spool shaft, a pinion gear, a rotor, a rotor nut, a collar member made of metal or resin, and a bearing (see Japanese Patent Application Publication No. 2016-029949).

The rotor nut is disposed on the pinion gear at the front area of the pinion gear. The rotor nut regulates the forward movement of the rotor relative to the pinion gear. The rotor nut rotates integrally with the pinion gear.

Generally, the collar member has a tubular shape. The collar member is disposed on the spool shaft in front of the pinion gear. The bearing is disposed on the collar member in the radial direction. The bearing is disposed between the collar member and the rotor nut in the radial direction, and rotatably supports the rotor nut relative to the spool shaft.

In the conventional spinning reel described above, the outer circumference of the spool shaft slides against the inner circumference of the collar member in a case where the spool shaft moves back and forth relative to the reel body.

For example, if the collar member is made of metal such as brass, it is difficult to precisely and smoothly process the surface roughness of the inner surface of the collar member having a small thickness. If the collar member is processed to have a larger thickness for accurate processing, the collar member itself and the bearing will become larger in diameter and weight. If the collar member is made of resin, this problem can be mitigated.

However, when resins such as polyacetal, which are generally used for sliding members, are used for collar members, the linear expansion coefficient of the collar member becomes large. Therefore, at low or high temperature, sliding resistance and rattling increase due to shrinkage or expansion of the inner and outer diameters of the collar member, and the sliding feeling becomes unstable.

The object of the present invention is to provide a collar member for a spinning reel that can stabilize the sliding feeling when the spool shaft moves in the front-back direction.

BRIEF SUMMARY

A collar member for a spinning reel in accordance with one aspect of the present invention is used for a spinning reel. The spinning reel has a reel body, a spool shaft that moves back and forth with respect to the reel body, a pinion gear that rotates around the spool shaft, a rotor nut that rotates integrally with the pinion gear, and a bearing that is disposed between the spool shaft and the rotor nut in a radial direction and rotatably supports the rotor nut. In this spinning reel, the collar member is disposed between the spool shaft and the bearing in the radial direction. The collar member is formed by a resin material. The resin material has a linear expansion coefficient of $10 \times 10^{-6}$ (1/° C.) or more and $50 \times 10^{-6}$ (1/° C.) or less.

Since the collar member for the spinning reel is formed by a resin material, the surface roughness of the inner surface of the collar member can be easily adjusted, and the collar member can be made smaller and lighter.

In the collar member for this spinning reel, the resin material has a linear expansion coefficient of $10 \times 10^{-6}$ (1/° C.) or more and $50 \times 10^{-6}$ (1/° C.) or less, which can reduce sliding resistance and rattling at low and high temperatures. In other words, the sliding feeling when the spool shaft moves back and forth can be stabilized.

In the collar member for the spinning reel in accordance with another aspect of the present invention, it is preferred that the resin material contains carbon. This configuration can further reduce the weight of the collar member in addition to the effects described above.

In the collar member for the spinning reel in accordance with another aspect of the present invention, the carbon is preferably carbon fiber. This configuration can improve the strength of the collar member.

In the collar member for the spinning reel in accordance with another aspect of the present invention, the carbon fiber should be 10-25 weight percent of the resin material. This configuration can suitably increase the strength of the collar member.

A spinning reel in accordance with another aspect of the present invention has a reel body, a spool shaft, a pinion gear, a rotor, a rotor nut, a bearing, and a collar member. The spool shaft is supported movably with respect to the reel body in a front-back direction. The pinion gear is disposed radially outside the spool shaft and rotates with respect to the spool shaft. The rotor is disposed radially outside the pinion gear and rotates integrally with the pinion gear.

The rotor nut regulates the forward movement of the rotor relative to the pinion gear. The rotor nut rotates integrally with the pinion gear. The bearing is disposed between the spool shaft and the rotor nut in the radial direction. The bearing supports the rotor nut to be rotatable with respect to the spool shaft.

The collar member is disposed between the spool shaft and the bearing in the radial direction. The collar member is made of a resin material. The resin material has a linear expansion coefficient of $10 \times 10^{-6}$ (1/° C.) or more and $50 \times 10^{-6}$ (1/° C.) or less. By configuring the collar member in this manner, this spinning reel can achieve the same effects as those described above.

The present invention can stabilize the sliding feeling when the spool shaft moves back and forth in the collar member for a spinning reel.

DETAILED DESCRIPTION

Figure 1:
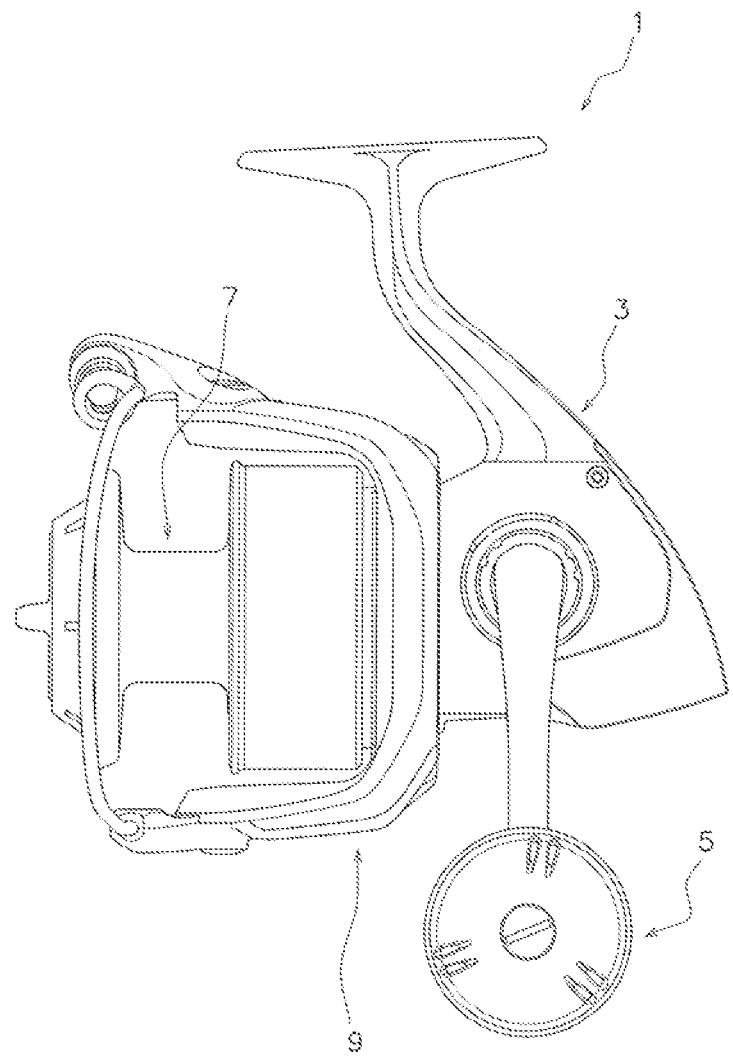
FIG. 1 is a side view of a spinning reel according to an embodiment of the present invention.
Figure 2:
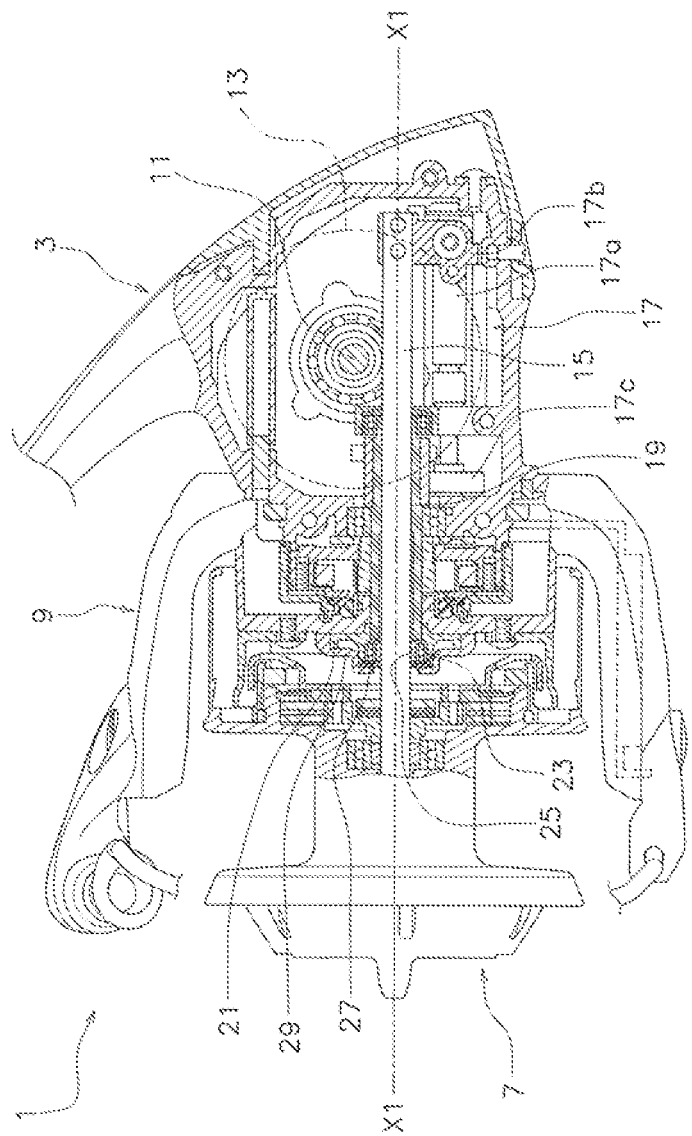
FIG. 2 is a longitudinal sectional view of the spinning reel.

A spinning reel 1 in which an embodiment of the present invention is employed includes a reel body 3, a handle 5, a spool 7, and a rotor 9, as shown in FIG. 1. As shown in FIG. 2, the spinning reel 1 further includes a handle shaft 11, a drive gear 13, a spool shaft 15, an oscillating mechanism 17, a pinion gear 19, a rotor nut 21, a bearing 23, and a collar member 25. The spinning reel 1 further includes a seal member 27 and a retaining member 29.

As shown in FIG. 1, the handle 5 is rotatably supported with respect to the reel body 3. In this embodiment, an example is shown where the handle 5 is positioned on the left side of the reel body 3. The handle 5 can also be positioned on the right side of the reel body 3. The handle 5 is attached to the handle shaft 11.

As shown in FIG. 2, the handle shaft 11 is rotatably supported with respect to the reel body 3. The drive gear 13 is mounted on the handle shaft 11 so that the drive gear 13 can rotate integrally with the handle shaft 11. The drive gear 13 meshes with the pinion gear 19.

As shown in FIG. 1, a fishing line is wound around the spool 7. The spool 7 is configured to move forward and backward with respect to the reel body 3 together with the spool shaft 15. The spool 7 is attached to the tip of the spool shaft 15.

As shown in FIG. 2, the spool shaft 15 is supported to be movable with respect to the reel body 3 in a front-back direction. The spool shaft 15 is inserted into the inner circumference of the pinion gear 19 which has a tubular shape. The spool shaft 15 moves back and forth with respect to the reel body 3 by the operation of the oscillating mechanism 17.

The spool shaft 15 has a spool axis X1. The front-back direction and an axial direction are the directions in which the spool axis X1 extends. A radial direction is the direction away from the spool axis X1. A circumferential direction and a rotational direction are the directions around the spool axis X1.

The oscillating mechanism 17 moves the spool shaft 15 in the front-back direction in accordance with the rotation of the handle shaft 11. The oscillating mechanism 17 is disposed in the internal space of the reel body 3. The oscillating mechanism 17 has a worm shaft 17a, a slider 17b, and an intermediate gear 17c. The worm shaft 17a is positioned parallel to the spool shaft 15. The worm shaft 17a is rotatably supported with respect to the reel body 3.

The slider 17b is fixed to the rear end of the spool shaft 15. The slider 17b is engaged with the groove of the worm shaft 17a and moves in the front-back direction with the rotation of the worm shaft 17a. The intermediate gear 17c is fixed to the front end of the worm shaft 17a and engaged with the pinion gear 19.

In the oscillating mechanism 17, when the handle shaft 11 is rotated by the rotating operation of the handle 5, the drive gear 13, the pinion gear 19, the intermediate gear 17c, and the worm shaft 17a rotate. This causes the slider 17b and the spool shaft 15 to move in the front-back direction.

The rotor 9 is used to wind a fishing line around the spool 7. The rotor 9 is disposed at the front area of the reel body 3. The rotor 9 is rotatable with respect to the reel body 3. The rotor 9 is disposed radially outside of the pinion gear 19. The rotor 9 is integrally rotatable with respect to the pinion gear 19.

The pinion gear 19 has a tubular shape. The pinion gear 19 is rotatably supported with respect to the reel body 3. The pinion gear 19 is disposed radially outside of the spool shaft 15. The pinion gear 19 rotates about the spool shaft 15. For example, the pinion gear 19 rotates around the spool axis X1. The rotor 9 rotates in accordance with the rotation of the pinion gear 19.

The rotor nut 21 is used to regulate the forward movement of the rotor 9 relative to the pinion gear 19. The rotor nut 21 rotates about the spool shaft 15. For example, the rotor nut 21 rotates around the spool axis X1.

Figure 3:
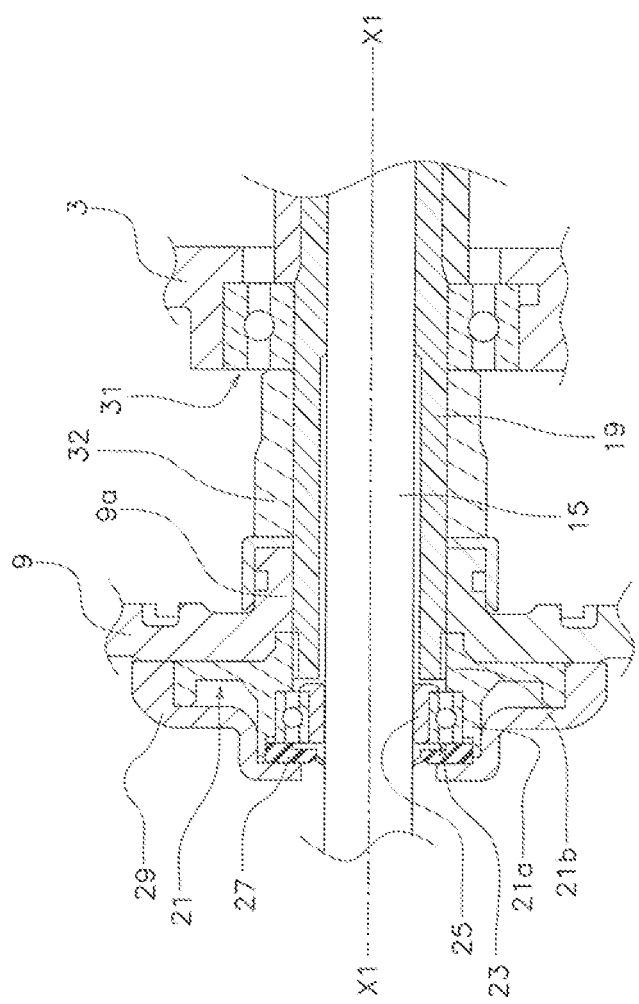
FIG. 3 shows a partially enlarged longitudinal sectional view of the spinning reel.

As shown in FIG. 3, the rotor nut 21 has a tubular portion 21a and a mounting portion 21b. The tubular portion 21a has a tubular shape. The tubular portion 21a is formed integrally with the mounting portion 21b. The tubular portion 21a has a larger diameter than the mounting portion 21b. The tubular portion 21a extends forward from the mounting portion 21b and is positioned forward of the front end of the pinion gear 19. The bearing 23 and the collar member 25 are disposed between the tubular portion 21a and the spool shaft 15 in the radial direction.

The mounting portion 21b is fixed to the front end of the pinion gear 19. For example, the mounting portion 21b is screwed to the front end of the pinion gear 19. This causes the rotor nut 21 to rotate integrally with the pinion gear 19. The mounting portion 21b contacts a radially inner portion 9a of the rotor 9, e.g., the portion 9a where the rotor 9 is mounted on the pinion gear 19. With this, the rotor nut 21 regulates the forward movement of the rotor 9 relative to the pinion gear 19.

The backward movement of the rotor 9 relative to the pinion gear 19 is regulated by a bearing 31 and a tubular member 32. The bearing 31 is disposed between the pinion gear 19 and the reel body 3. The outer ring of the bearing 31 is attached to the reel body 3. The inner ring of bearing 31 is disposed on the outer circumference of the pinion gear 19. The tubular member 32 is disposed between the bearing 31 and the rotor 9 in the axial direction. In more detail, the tubular member 32 is disposed between the bearing 31 and the radially inner portion 9a of the rotor 9 in the axial direction.

The bearing 23 rotatably supports the rotor nut 21 with respect to the spool shaft 15. For example, the bearing 23 rotatably supports the rotor nut 21 with respect to the spool shaft 15 via the collar member 25.

The bearing 23 is disposed between the spool shaft 15 and the rotor nut 21 in the radial direction. In more detail, the bearing 23 is disposed forward of the pinion gear 19. The outer ring of the bearing 23 is integrally rotatable with respect to the inner surface of the rotor nut 21, for example, the inner surface of the tubular portion 21a. The inner ring of the bearing 23 is disposed on the outer circumference of the collar member 25. Rolling elements are placed between the outer and inner rings of the bearing 23.

The seal member 27 has an annular shape. The seal member 27 is attached to the rotor nut 21. For example, the seal member 27 is attached to the opening end of the tubular portion 21a of the rotor nut 21. The seal member 27 thereby covers the front end of the bearing 23. The inner end of the seal member 27 contacts the spool shaft 15.

The retaining member 29 holds the seal member 27. The retaining member 29 is attached to the rotor nut 21. The retaining member 29 positions the seal member 27 relative to the rotor nut 21. For example, the seal member 27 is held in the axial direction by the retaining member 29 and the opening end of the tubular portion 21a of the rotor nut 21.

The collar member 25 has a tubular shape. The collar member 25 is disposed between the spool shaft 15 and the bearing 23 in the radial direction. For example, the collar member 25 is disposed between the outer circumference of the spool shaft 15 and the inner ring of the bearing 23 in the radial direction.

The spool shaft 15 is inserted into the inner circumference of the collar member 25. A minute gap is formed between the inner circumference of the collar member 25 and the outer circumference of the spool shaft 15. In this state, the spool shaft 15 moves in the front-back direction along the inner surface of the collar member 25.

The collar member 25 is formed by a resin material. The resin material contains carbon. The resin material can further contain polyacetal. For example, the carbon is carbon fiber. The carbon fiber is 10-25 weight percent of the resin material. The carbon can contain granular carbon rather than fibrous carbon. The carbon can also include both fibrous and granular carbon.

The resin material has a linear expansion coefficient of $10 \times 10^{-6}$ (1/° C.) or more and $50 \times 10^{-6}$ (1/° C.) or less. For example, in a case where the temperature is between 23 (° C.) and 55 (° C.), the average value of the coefficient of linear expansion is set between $10 \times 10^{-6}$ (1/° C.) and $50 \times 10^{-6}$ (1/° C.). The resin material has a coefficient of kinetic friction which is more than 0.15 and less than 0.40. The coefficient of kinetic friction is used to define the surface roughness of the inner surface of the collar member 25.

The spinning reel 1 described above has the following features. In the spinning reel 1, the surface roughness of the inner surface of the collar member 25 can be easily adjusted because the collar member 25 is formed by a resin material. This improves the sliding feeling when the spool shaft 15 slides with the inner circumference of the collar member 25.

If the gap between the collar member 25 and the spool shaft 15 in the radial direction is designed to be small to reduce the rattling of the spool shaft 15 against the collar member 25 after adjusting the surface roughness of the inner surface of the collar member 25, the gap may change due to temperature changes, and the sliding feeling may be deteriorated. In the spinning reel 1, however, the resin material has a linear expansion coefficient of $10 \times 10^{-6}$ (1/° C.) or more and $50 \times 10^{-6}$ (1/° C.) or less, and thus, the deterioration in the sliding feeling can be suppressed.

As discussed above, in the spinning reel 1, the collar member 25 is formed of a resin material, and the linear expansion coefficient of the resin material is set to $10 \times 10^{-6}$ (1/° C.) or more and $50 \times 10^{-6}$ (1/° C.) or less to stabilize the sliding feeling when the spool shaft moves in the front-back direction.

Further, in the spinning reel 1, since the resin material contains carbon, the weight of the collar member 25 can be made small. Furthermore, since the carbon is carbon fiber, the strength of the collar member 25 can be improved. When the carbon is granular carbon rather than fibrous carbon, the orientation of shrinkage during injection molding can be suppressed and the collar member can be molded with high precision. In addition, since the carbon fiber is 10-25 weight percent of the resin material, the strength of the collar member can be suitably increased.

The present invention can be used for spinning reels.

REFERENCE SIGNS LIST

1 Spinning reel
3 Reel body
9 Rotor
15 Spool shaft
19 Pinion gear
21 Rotor nut
23 Bearing
25 Collar member

What is claimed is:

1. A spinning reel, comprising:
a reel body;
a spool shaft movably supported to reciprocate in a front-back direction with respect to the reel body;
a pinion gear disposed outside of the spool shaft in a radial direction and configured to rotate around the spool shaft as the spool shaft reciprocates;
a rotor disposed outside of the pinion gear in the radial direction and configured to rotate integrally with the pinion gear;
a rotor nut disposed between the spool shaft and the rotor in the radial direction, the rotor nut configured to restrict forward movement of the rotor relative to the pinion gear and to rotate integrally with the pinion gear;
a bearing disposed between the spool shaft and the rotor nut in a radial direction and rotatably supporting said rotor nut with respect to said spool shaft; and
a collar member through which the spool shaft passes, the collar member being disposed between the bearing and the spool shaft to support the spool shaft as it reciprocates back-and-forth relative to the bearing,
wherein the collar member is formed by a resin material that has a linear expansion coefficient of $10 \times 10^{-6}$ (1/° C.) or more and $50 \times 10^{-6}$ (1/° C.) or less, the resin material containing carbon fiber constituting 10-25 weight percent of the resin material.

2. The spinning reel according to claim 1, wherein
the collar member has a tubular shape in which the spool shaft is movable along an inner surface of the collar member in the front-back direction, and
a surface roughness of the inner surface of the collar member is defined by the linear expansion coefficient.

* * * * *